Figure 1:
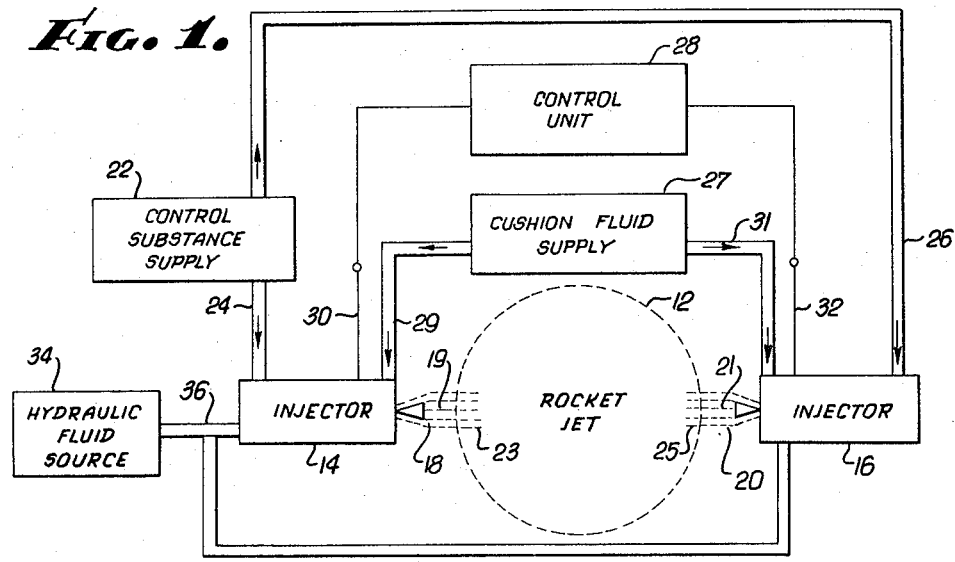

Feb. 6, 1968     D. C. HOWLAND     3,367,350

FLUID EJECTOR

Filed May 3, 1963

INVENTOR.
DONALD C. HOWLAND
BY
Nilsson & Robbins
ATTORNEYS.

United States Patent Office

3,367,350
Patented Feb. 6, 1968

3,367,350
FLUID EJECTOR
Donald C. Howland, Costa Mesa, Calif., assignor, by mesne assignments, to Cadillac Gage Company, Warren, Mich., a corporation of Michigan
Filed May 3, 1963, Ser. No. 277,823
4 Claims. (Cl. 137—81.5)

The present invention relates to a fluid-ejection apparatus, which may be employed to control a rocket-propelled vehicle, by injecting fluid into the rocket jet.

Various control apparatus have been employed in the past to direct the course of a rocket-propelled vehicle and thereby accomplish the desired path of flight. For example, auxiliary rockets have been used to alter a vehicle's direction-of-travel and thereby accomplish guidance. Auxiliary rockets on a vehicle are rather expensive and they consume considerable valuable fuel which might otherwise more effectively propel the rocket vehicle along the desired course.

Various other techniques employed to control the path of a rocket-driven vehicle have similarly been somewhat complex in structure and expense of fuel. Therefore, substantial effort has been directed toward the development of a guidance technique which does not require complex apparatus, and which is economical of rocket fuel. Recently, it has been discovered that if a stream of fluid (or other substance) is injected at one side of a rocket jet, the jet is deflected away from the stream of injected fluid and consequently the body of the rocket jet becomes angularly offset from the course of the rocket vehicle. As a result, the heading of the vehicle is altered as it seeks alignment with the composite force reactive of the rocket jet. Therefore, by providing several injectors of guide fluid, about the rocket jet, this technique may be employed to direct the course of a rocket-propelled vehicle.

A precise or rigorous explanation of the phenomena described above along with the physical forces developed about the rocket jet to accomplish the deflection have not been formulated within the inventor's knowledge. However, this concept is germain herein only in that the present invention provides an apparatus for injecting a regulated stream of guide substance into a rocket jet so that the stream is more effective.

It is apparent that a variety of systems utilizing various well known electrical and hydraulic components could be adapted to inject a stream of guide substance into a rocket jet under control of an electrical signal. However, certain subtle considerations are present for such structures which demand a rather special apparatus. Specifically, it has been found that it is important that the stream of guide substance be confined to a relatively-small diameter for greater effect in the rocket jet. That is, the stream should remain concentrated in a small sectional area along much of its length. Furthermore, the stream-forming apparatus should be relatively simple to provide reasonable initial cost and reliable operation during flight.

In general, the present invention comprises a fluid-ejection apparatus useful in the guidance of a rocket-propelled vehicle. More specifically, the apparatus includes means for ejecting a stream of fluid under control of an electrical signal or other control parameter. An additional part of the structure then delivers cushion fluid which is provided in the form of an envelope about the stream of central fluid so as to provide a boundary layer about the ejected fluid which tends to preserve the ejected fluid in a stream of relatively-small diameter. Means for controlling the volume of cushion fluid released may also be provided in the apparatus.

Accordingly, an object of the present invention is to provide an improved system for guiding a rocket-driven vehicle.

Another object of the present invention is to provide an improved apparatus for injecting guide substance as fluid into a rocket engine jet, to thereby deflect the jet and change the heading of the jet-driven vehicle.

Still another object of the present invention is to provide an improved system for ejecting fluid in a concentrated stream.

Still a further object of the present invention is to provide an apparatus for ejecting a controlled stream of substance, which is maintained in a dense concentration by providing a fluid cushion about the ejected stream.

Figure 2:
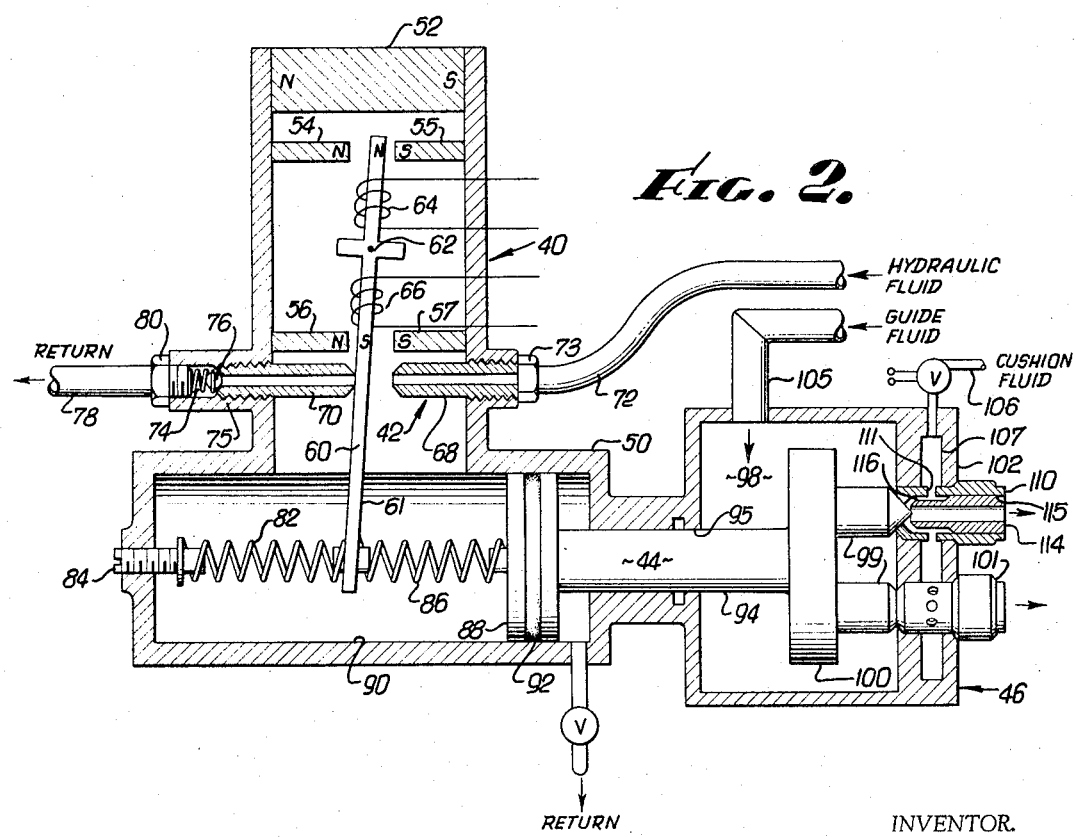

These and other objects and advantages of the present invention as well as additional features thereof will become apparent from a consideration of the following description taken in conjunction with the appended drawings, wherein:

FIGURE 1 is a diagrammatic representation of a system incorporating the present invention; and FIGURE 2 is a sectional view of a hydraulically-controlled apparatus for ejecting fluid which may be incorporated in the system of FIGURE 1.

Referring initially to FIGURE 1, there is shown a rocket jet 12 in section, which is associated with a vehicle (not shown) that is propelled by the engine forming the jet 12. Positioned adjacently the jet 12, in diametrically-opposing relationship, are ejectors 14 and 16 which serve to dispense streams 18 and 20 respectively, of fluid (or other guide substance) into the rocket jet 12. As previously indicated, a stream of guide substance which for example may be freon or various other inert substances, injected into the rocket jet deflects the jet away from the injected stream to change the heading of the rocket vehicle and accomplish the desired guidance. It is to be noted that the injectors 14 and 16 normally operate in an inverse manner. That is, if the injector 14 is open to provide a large stream 18, the injector 16 is cut off so that its stream 20 is very small or totally nonexistent.

The streams 18 and 20 actually have two components, as shown somewhat in section. The interiors 19 and 21 of the streams 18 and 20 respectively comprise guide substance which is confined in concentrated sections by cushion-fluid envelopes 23 and 25. The cushion fluid may comprise various substances as air or helium which is ejected with the guide substance as explained in detail below.

The injectors 14 and 16 receive guide substance to form the streams 18 and 20 from a common supply 22, which is connected to the injector 14 by a channel 24 and to the injector 16 by a channel 26. In a somewhat similar fashion, the injectors 14 and 16 receive cushion fluid from a supply 27 connected to the injectors by channels 29 and 31 respectively. It is to be noted that the supplies 22 and 27 may comprise reservoirs, or various other apparatus for providing a pressurized flowable substance usable in the streams 18 and 20. For example, the cushion fluid supply 27 may take the form of a funnel to capture moving hot gases available about the vehicle.

The injectors 14 and 16 are controlled by a control unit 28 which provides electrical signals to the injector 14 through an electrical cable 30 and to the injector 16 through a similar cable 32. The control unit 28 may take the form of a variety of structures; however, in function it provides electrical signals indicative of desired deflections for the rocket jet 12. The control unit 28 may, for example, comprise various well-known inertial guidance apparatus, or alternatively, may take the form simply of a receiver for delivering electrical signals from a control station. Thus, a wide variety of forms for the control unit 28 is feasible; and the present invention is in no way limited to any specific structure for that unit.

In operation, the system of FIGURE 1 controls the flight path of a vehicle by injecting guide substance into the rocket jet to deflect it. Specifically, the control unit 28 provides electrical signals to the injectors 14 and 16 which inject fluid streams 18 and 20 from the substance supplies 22 and 27 into the rocket jet 12 to deflect the jet away from the heading of the propelled vehicle. It is to be noted, that several injectors may be employed in conjunction with an actual installation; however, the two injectors 14 and 16 of FIGURE 1 serve adequately to illustrate the method of control. These injectors are similar and utilize fluid in their control function which fluid is supplied from a source 34 through a fluid conduit 36 connected to each of the injectors. Hydraulic fluid expended in this control function may be returned to the source 34 and pressurized for reuse or may alternatively simply be ejected from the vehicle as waste.

In controlling the vehicle by this technique, the effectiveness of the guide substance is somewhat related to the degree to which it is confined in a tight stream, i.e. the sectional area of the stream interiors 19 and 21. The structure of the present invention is incorporated in the injectors to accomplish the desired tight stream, and consideration will now be directed to that apparatus.

Considering the injectors 14 and 16, reference will now be had to FIGURE 2 which discloses one injector in detail. The structure includes a torque motor 40 (generally indicated) which regulates a flapper valve 42 to determine the position of an actuator 44 that controls the amount of guide substance flowing from the injector valve structure 46.

An integral body 50 of the unit serves to house each of the components mentioned above. The upper portion of the body 50 houses the torque motor 40, which includes a permanent magnet 52 that provides flux through a portion of the body 50 to magnetic pole pieces 54, 55, 56, and 57. The pole pieces 54 and 55 are affixed to opposing sides of the upper section of the body 50 to provide a magnetized gap between their ends. The pole pieces 56 and 57 are similarly mounted at lower positions in the body 50. A permeable armature 60 is mounted to move about a point 62 with its elongate ends extending between pairs of the pole pieces. The armature 60 carries magnetizing coils 64 and 66, respectively mounted above and below the point 62.

The principle of operation of torque motors of the type shown in FIGURE 2 are well known. Briefly, electrical currents are passed through the coils 64 or 66 (or both) to magnetize the armature 60 in a selected sense along the length thereof. Depending upon the direction of magnetization of the armature 60 (polarity) it is repelled by two diametrically-located pole pieces e.g. 54 and 57, and attracted by the other two pole pieces, e.g. 55 and 56. The result is a push-pull action tending to revolve the armature about the point 62, the force of which is a manifestation of the electrical signals forming currents in coils 54 and 56.

As the armature is revolved by magnetic forces (either clockwise or counterclockwise through a small angle) the lower portion or extended arm 61 of the armature 60 moves to the right or left from an equilibrium position. The mid-section of the arm 61 lies between stops to limit the degree of movement, which stops are formed by a nozzle 68 and an outlet duct 70.

The nozzle 68 is threadably affixed in a port of the body 50 and receives a conduit 72 by means of a tube flange nut 73. The conduit 72 is connected to a source of hydraulic fluid (e.g. source 34 in FIGURE 1) which supplies pressurized operating fluid to the unit.

The outlet duct 70 is threadably affixed in a port 75 of the body 50 which port also houses a coil spring 74 and a ball 76 to provide a release valve coupling the duct 70 to an outlet conduit 78, which is affixed to the body 50 by a flange nut 80. The conduit 78 is connected to "return" which may either be a return stump, not shown, or simply a discharge path for ejecting fluid from the system as waste.

The lower extension of the arm 61 is connected on the left side to a coil spring 82 which is in turn affixed to an adjustment screw 84 threadably affixed in the body 50, to serve as a centering adjustment for the armature 60. The right side of the arm 61 carries another coil spring 86 functioning as a feedback spring, which is connected to a piston 88 mounted in the lower cylindrical section 90 of the body 50.

The piston 88 carries an O-ring seal 92 which slidably mates with the interior of the cylindrical section 90. The piston is affixed to a rod 94 which is coaxial with the cylindrical section 90 and the piston 88. The rod 94 passes out of the cylindrical section 90 through a port 95 into a cavity 98 (also within the body 50). The cavity 98 houses a plunger 100 affixed to the rod 94 for controlling the volume or rate at which guide substance is ejected and thus injected into the jet. The plunger 100 carries two closure pistons 99 (of course various numbers can be employed) on its end face. The pistons 99 terminate in conical sections that cooperate with seat assemblies 101 contained in the hollow end wall 102 of the body 50 which closes the cavity 98.

To supply the substance stream, the cavity 98 receives guide substance under pressure through a conduit 105 which is connected to a source of such substance, e.g. the substance supply 22 of FIGURE 1. The cushion fluid of the stream is provided from a passage 106 which is connected to a source of cushion fluid as previously described to supply air, helium, nitrogen or other generally-stable substances.

The cushion substance flows from the passage 106 through an electrically-controlled valve 108 into the cavity 107 within the end wall 102, from which it is ejected. The valve 108 may be provided to cut off the flow of cushion fluid when no control fluid is being ejected. The control signals for the valve are provided from the control unit 28 (FIGURE 1) just as the signals for the coils 64 and 66.

The injector seat assemblies 101 in the end wall 102 are similar in structure, the upper assembly is shown in section while the lower assembly is shown in elevational view. The assemblies 101 include an external cylindrical member 110 of uniform interior diameter and stepped exterior diameter, which member is contained within a port of the wall 102. The shoulder between the steps of the exterior diameter of the cylindrical member 110 abuts the outside of wall 102 so that the reduced-diameter portion of the member extends through the cavity 107 to be fixed in the inside of the wall 102 and receive the conical portion of piston 99. The section of the cylindrical member 110 lying in the cavity 107 has ports about its curved surface which are spaced apart to somewhat uniformly receive the cushion fluid from the cavity 105.

The cylindrical member 110 contains a sleeve 114 of uniform internal diameter and having a stepped external diameter. The larger external section 115 of the sleeve 114 is external the apparatus and provides a friction fit with the cylindrical member 110. The inner portion 116 of the sleeve 114 extends to a location somewhat short of the end of the plunger 99, so as to provide a cylindrical passage from all the ports 111 about the piston 99 and into the inner passage of the seat assembly.

Considering the operation of the apparatus of FIGURE 2, assume initially that in accordance with the previous example, electrical signals are applied to the coils 64 and 66 to move the lower arm 61 of the armature 60 to the left, as shown in the drawing. Thereupon, an increased volume of hydraulic fluid is passed by the nozzle 68 into the cylindrical chamber 90 and coincidentally the exit path of fluid from the chamber 90 through the outlet port 70 is obstructed to a greater extent. These flow controls cause the pressure to increase within the cylindrical section 90 so that the piston 88 is urged to the right, moving the pistons 99 deeper into the ejector seat apparatus 101 and reducing the stream therefrom. It is to be noted that the piston 88 exerts a feedback force on the armature 60 through a spring 86, therefore, the system is stabilized.

As the pistons 99 move to the right, they engage the seat assemblies 101 and cut off the flow therefrom. Now, if signals are applied to the coils 64 and 66 to move the pistons 99 to the left, the control streams are formed. That is, fluid from the cavity 98 flows out through the fluid ejectors 101 around the pistons 99. As the fluid flows out of the ejectors, the valve 106 is opened and cushion fluid passes from the cavity 105 through the ports 111 to form a somewhat cylindrical envelope about the guide substance. As a result, when the guide substance exits from the ejector, it remains confined in a stream of relatively-small diameter and therefore has greater effectiveness upon injection into the rocket jet.

The precise phenomena which occurs within the ejected streams of fluid is not completely understood. However, tests substantiate the effectiveness of the cushion fluid provided about the guide fluid to maintain the guide fluid in a confined stream. This feature of the invention results in a considerable increase in the effectiveness of guide fluid.

Other important features of the present invention will become apparent to one skilled in the art; however, it is to be understood that the present invention is not to be limited to the details of the embodiment disclosed herein, which has been presented by way of example only and in the cause of providing what is believed to be a useful and readily understood description of the principles of the invention. The scope of the invention is to be determined in accordance with the claims set forth below.

What is claimed is:

1. In combination with a reaction motor for providing a propelling rocket jet, a thrust control system for directing said rocket jet by injection of guide fluid and cushion fluid, in accordance with a control signal, comprising:
    a plurality of guide fluid ejector valves adapted to be mounted contiguous to said rocket jet whereby to inject a controlled stream of guide fluid through an ejection port thereof, into said rocket jet for diverting at least a portion of said rocket jet in accordance with said control signal;
    means for supplying each of said guide fluid ejector valves with guide fluid;
    means defining an annular passage exterior of, and substantially concentric to said ejection port of each of said guide fluid ejector valves, said annular passage being in annular communication with said ejection port; and
    means for supplying said annular passage of each of said guide fluid ejector valves with said cushion fluid.

2. In combination with a reaction motor for providing a propelling rocket jet, a thrust control system for directing said rocket jet by injection of guide fluid and cushion fluid, in accordance with a control signal, comprising:
    a plurality of guide fluid ejector valves adapted to be mounted contiguous to said rocket jet whereby to inject a controlled stream of guide fluid through an ejection port thereof, into said rocket jet for diverting at least a portion of said rocket jet in accordance with said control signal;
    means for supplying each of said guide fluid ejector valves with guide fluid;
    means defining an annular passage exterior of, and substantially concentric to said ejection port of each of said guide fluid ejector valves, said annular passage being in annular communication with said ejection port; and
    means, including a cushion fluid control valve, for supplying said annular passage of each of said guide fluid ejector valves with said cushion fluid whereby said cushion fluid provides a fluid cushion about guide fluid from said ejection port to confine said guide fluid.

3. A system according to claim 2 wherein said annular passage is upstream the outlet of said ejection port.

4. A system according to claim 3 wherein said guide fluid ejector valves comprise electro-hydraulic control means.

References Cited

UNITED STATES PATENTS

| | | | |
|---|---|---|---|
| 3,039,490 | 6/1962 | Carlson | 137—81.5 |
| 3,239,150 | 3/1966 | Chisel | 137—81.5 X |
| 2,692,800 | 10/1954 | Nichols | 137—81.5 |
| 3,016,063 | 1/1962 | Hausmann | 137—81.5 |
| 3,042,005 | 7/1962 | Gray | 137—623 X |
| 3,055,383 | 9/1962 | Paine | 137—623 X |
| 3,070,957 | 1/1963 | McCorkle | 60—35.6 |
| 3,128,602 | 4/1964 | Salemka | 60—35.4 |
| 3,135,291 | 6/1964 | Kepler | 137—81.5 |
| 3,208,464 | 9/1965 | Zilberfarb | 137—81.5 |

M. CARY NELSON, *Primary Examiner.*

S. SCOTT, *Assistant Examiner.*